June 12, 1951 — C. E. PATTERSON — 2,556,659
TUBE COUPLING
Filed Dec. 20, 1948 — 2 Sheets-Sheet 1
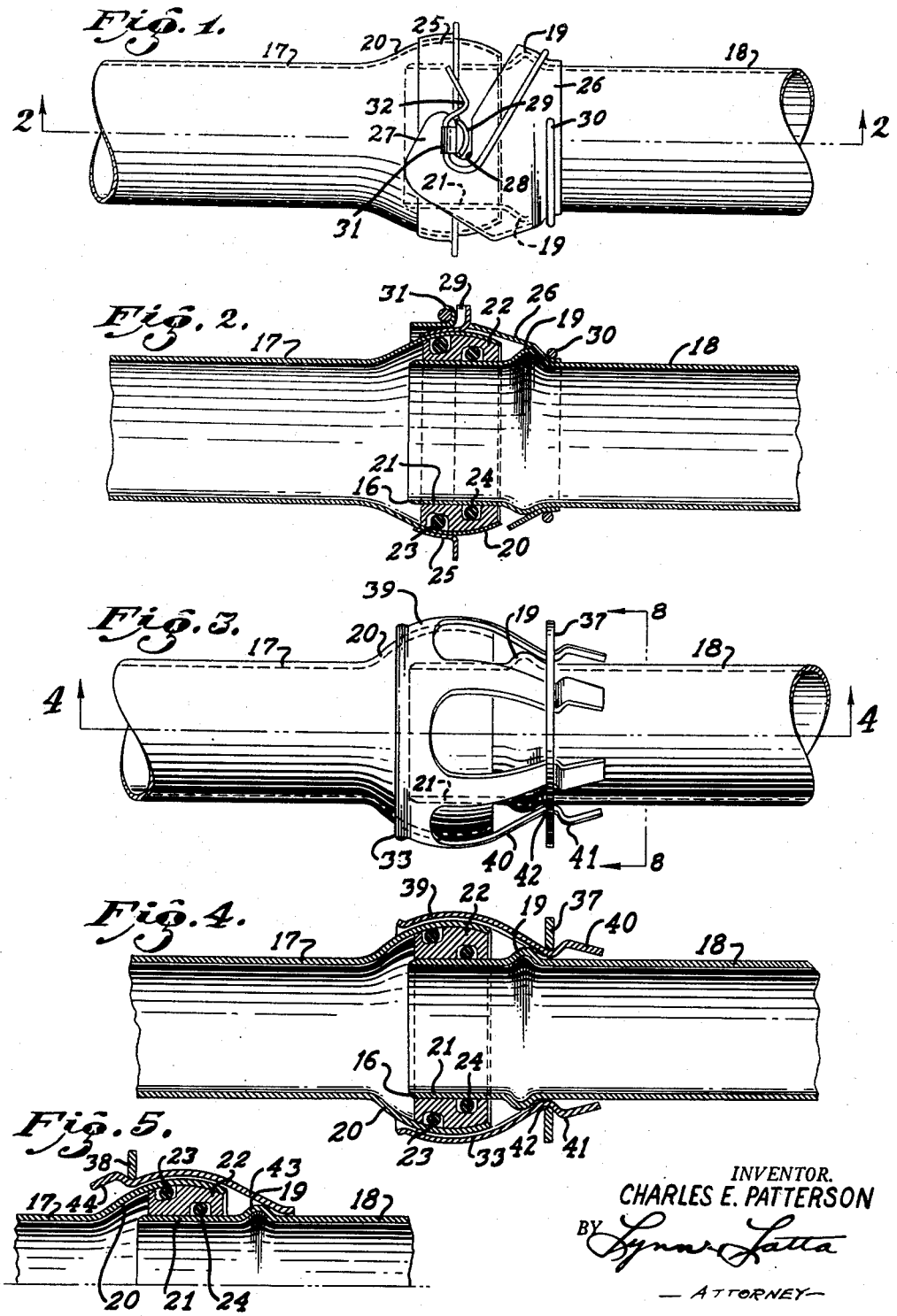
INVENTOR.
CHARLES E. PATTERSON
BY Lynn Latta
— ATTORNEY —

June 12, 1951 C. E. PATTERSON 2,556,659
TUBE COUPLING
Filed Dec. 20, 1948 2 Sheets-Sheet 2
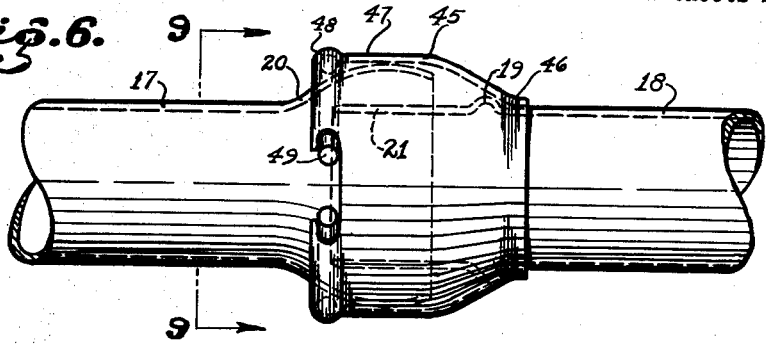
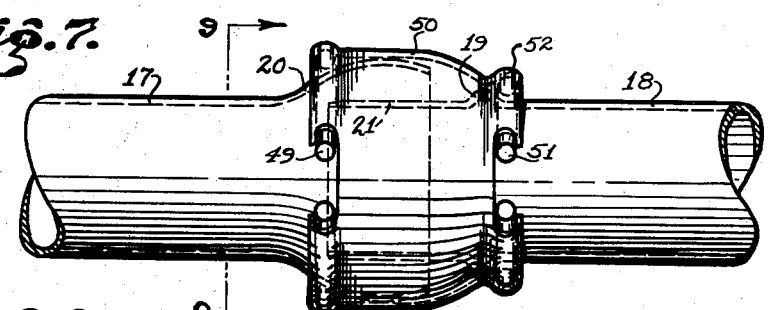
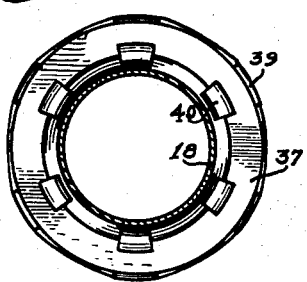
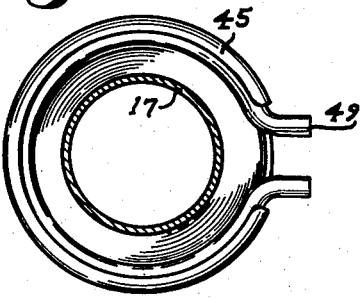
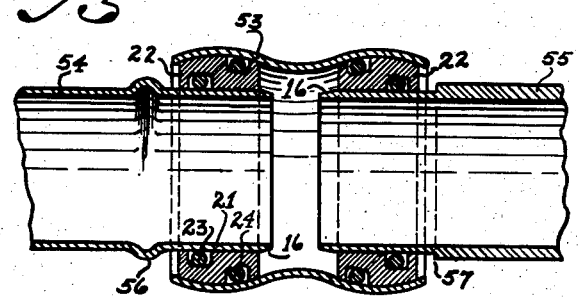
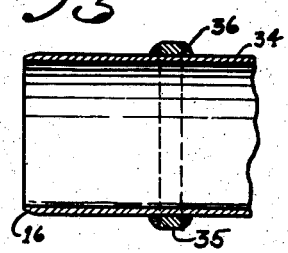
INVENTOR.
CHARLES E. PATTERSON
BY
—ATTORNEY—

Patented June 12, 1951

2,556,659

UNITED STATES PATENT OFFICE 2,556,659

TUBE COUPLING

Charles E. Patterson, Pacific Palisades, Calif.

Application December 20, 1948, Serial No. 66,298

15 Claims. (Cl. 285—91)

My invention relates to couplings and more particularly to means for connecting conduits together.

An important object of the invention is to provide means for quickly and effectively connecting conduits together in fluid-tight connection, which connecting means may be as quickly disconnected for replacement, repairs or any other purpose.

Another object is to provide connecting means that will allow a small amount of relative movement axially between the connecting conduits and a considerable amount of angular movement, and will also include snap-acting spring means tending to maintain the fluid tight connection.

A further object is to provide means to yieldingly tend to hold the connection together and resiliently resist disengaging the connecting means.

Still another object is to provide easily obtainable, simple means to hold the connected elements together, at sides thereof, in combination with means to distribute the load around the connected conduits.

My invention also has for its objects to provide such means that are positive in operation, convenient in use, easily installed in a working position and easily disconnected therefrom, economical of manufacture, relatively simple, and of general superiority and serviceability.

Further objects of invention will be apparent in the ensuing specification and appended drawings, in which:

Fig. 1 is a broken, elevational view of an embodiment of certain of the foregoing objects.

Fig. 2 is a longitudinal sectional view taken on the line 2—2 of Fig. 1.

Fig. 3 is a longitudinal view of a modified construction.

Fig. 4 is a longitudinal sectional view taken on the line 4—4 of Fig. 3.

Fig. 5 is a half sectional view similar to Fig. 4 but differing in respect to the spring fingers and locking ring being on the opposite side.

Fig. 6 is a broken elevation of another modified construction with removable locking means on one side only.

Fig. 7 is another broken elevation of a modified construction similar to Fig. 6 but with the locking means on both sides of the coupling.

Fig. 8 is a transverse section taken on line 8—8 of Fig. 3.

Fig. 9 is a transverse section taken on lines 9—9 of Figs. 6 and 7.

Fig. 10 is a broken, longitudinal section showing still another modified construction.

Fig. 11 is a broken, longitudinal section through an additional modification.

As an example of one form in which the invention may be embodied, I have shown in Figs. 1 and 2 a fluid coupling, including a pair of conduits, 17 and 18, which have a swivel and universal connection with each other. All the male conduits in the present invention have externally bevelled ends, as shown at 16, to aid in their insertion. Conduit 18 has a bead or other external enlargement 19, while the conduit 17 has an end 20 that is a segment of a sphere.

Between the cylindrical end 21 of the conduit 18 (beyond the bead 19) and the end 20 of conduit 17 is disposed an annular packing carrier 22 that is cylindrical on its inner surface and a segment of a sphere on its outer surface, conforming respectively with the outer face of the end 21 and with the inner face of the end 20. Said outer and inner faces of the carrier respectively have outwardly and inwardly facing annular recesses for receiving O sealing rings 23 and 24. It is believed clear that with this arrangement the conduit 17 may be tipped universally in relation to conduit 18 without disturbing the sealing relationship of the O rings.

To maintain the conduits 17 and 18 in telescoping connecton with each other, collars 25 and 26 are slipped on the conduits 17 and 18 from the small ends thereof and slid onto the curved end 20 and the bead 19. The collar 26 has a hook 27 defining a recess 28 with the body member of the collar 26, while the collar 25 has a lip 29 normally engaging the recess 28. One end of a wire 30 embraces the collar 26 and extends over the bent-over lug 31 on collar 26 along the side of the recess 28. The other end of the wire 30 has a spring snap 32 that resiliently bars the entrance to the recess 28. The spring snap yieldingly retains the lip 29 in the recess, to hold the conduit sections 17 and 18 together.

In use, the carrier 22, is assembled in the curved end 20, with the O rings in place, as shown. The end 21 is inserted in the carrier to the position shown. The collars and/or the slip connection of the conduit sections are rotatable to cause the lip 29 to be engaged by the recess 28. During such engaging action, the snap-acting spring 32 is sprung out of the way to admit the lip to the recess, and thereafter the spring snaps back in position, tending to prevent disengagement of the lip 29 from the recess, and the fluid-tight connection is maintained.

Fig. 10 illustrates the conduit section 34 that may be employed instead of the conduit section 18, the only difference being that instead of the bead 26, a ring 35 may be mounted circumferentially of the conduit 34. The ring 35 may be welded, brazed, soldered or otherwise fastened in place, as suggested by 36. Such rings may be used instead of beads throughout.

In the forms shown in Figs. 3, 4, 5, 6 and 7, conduit sections have the same swivel and universal action as described above for Figs. 1 and 2. The elements numbered 16, 17, 18, 19, 20, 21, 22, 23 and 24 have the same function as described for Figs. 1 and 2 and are identical in construction for each of Figs. 1, 2, 3, 4, 5, 6 and 7. The difference in form is in the method used to prevent separation of the coupling.

The form illustrated in Figs. 3, 4, and 8 has a collar 39 of partial spherical section with spring fingers 40. The spring fingers are sufficiently resilient to allow the collar to be slipped over conduit 17 until the spherical section of collar 39 is engaged with spherical end 20. With end 21 of conduit 18 entered into carrier 22 fingers 40 of collar engage bead 19. Fingers 40 have depressions 42 and knuckles 41. Ring 30 is moved axially to snap over resilient knuckles and is held in the depressions by the knuckles. The depressions in turn are held to a diameter smaller than the external diameter of bead 19. This effectively prevents separation of conduits 17 and 18 while allowing a small amount of axial movement and an appreciable amount of angular motion between the conduits.

Fig. 5 illustrates a variation of Fig. 4 in which the collar 43 rigidly engages bead 19 of conduit 18. Ring 38 snaps over spring fingers 44 to engage the spherical portion 20 of conduit 17. Thus Fig. 5 merely serves to illustrate the same connecting principle with the external elements assembled in the opposite direction.

In Figs. 6 and 9 a collar 45 surrounds the coupling. It is slipped over conduit 18 until reduced section 46 engages bead 19. End 47 of collar surrounds spherical section 20 of conduit 18 and spring locking member 49 snaps into groove 48. The inside diameter of locking member when in place in groove is smaller than the external diameter of spherical section 20 of conduit 17. This effectively prevents separation of the coupling while allowing movement the same as in previous forms.

Fig. 7 is the same as Fig. 6 except that a spring locking member 51 and groove 52 are added to the smaller end of collar 50. The double lock feature permits installation of the collar over either end of either conduit 17 or 18.

Fig. 11 illustrates a form of coupling in which two spherical surfaces on a common conduit section are used each with its packing carrier to join conduits such as 54 and 55 to give increased angular motion, also translation with respect to each other, or a combination of translation and angular motion.

Elements 16, 21, 23 and 24 have the same function and are identical to the same numbered elements in the other figures. The conduit 53 has two spherical sections fitting closely with two packing carriers 22 which in turn engage conduits 54 and 55. Bead 56 and shoulder 57 both prevent their respective conduits from protruding through packing carrier far enough to cause interference. Elements 54 and 55 illustrate two ways of forming conduit ends. It is further assumed that one or more of the methods shown to prevent disassembly may be combined with either or both ends of the coupling shown in Fig. 11.

While I have illustrated and described what I now regard as the preferred embodiments of my invention, the constructions are, of course, subject to modification without departing from the spirit and scope of my invention. I, therefore, do not wish to restrict myself to the particular forms of construction illustrated and described, but desire to avail myself of all modifications that may fall within the scope of the appended claims.

I claim:

1. In a tube coupling, a plurality of conduits to be coupled, one having a female end portion in the form of a segment of a sphere and the other having a cylindrical end portion received in said female end portion and spaced therefrom to define an annular space, a retainer ring disposed in said annular space and having a cylindrical bore receiving said clyindrical end portion for axial movement thereon and having a segmental spherical periphery fitted within said female end portion for universal movement therein, said retainer ring having external and internal annular grooves cooperating with said female and cylindrical end portions respectively to define annular channels having dimensions greater in the axial than the radial direction, an O ring disposed within each of said annular channels, under compression between the bottom of the respective channel and the respective end portions and spaced from the respective side walls of the channels, a bead on said cylindrical end portion adjacent the end of said female portion and connecting means encircling and having end portions arranged in encircling and clutching engagement with said female end portion and bead respectively, such as to provide for unrestricted rotation between said cylindrical and female end portions about the major axis of said coupling, and to join said cylindrical and female end portions against axial separation.

2. In a tube coupling, a plurality of conduits to be coupled, one having a female end portion in the form of a segment of a sphere and the other having a cylindrical end portion receivable in said female end portion, spaced therefrom to define an annular space and having an external bead adjacent to said female end portion, a retainer ring disposed in said annular space and having a cylindrical bore receiving said cylindrical end portion for axial movement thereon and having a segmental spherical periphery fitted within said female end portion for universal movement therein, said retainer ring having external and internal annular grooves, resilient packing rings in sealing engagement between said grooves and said female and cylindrical end portions respectively, and connecting means arranged in encircling and clutching engagement with said female end portion and bead respectively to normally secure said conduits against axial separation while allowing unrestricted relative rotation thereof about the major axis of the joint, said connecting means including releasable locking means for normally maintaining said clutching engagement but operable to release said engagement and to thereby effect separation of the conduits.

3. A tube coupling as defined in claim 2 wherein said retainer ring provides a rotatable connection between said conduits, wherein said connecting means comprises two annuli, one engaging said female end portion and the other engaging said bead, and wherein said releasable locking means comprises interlocking means on the respective annuli, engageable and releasable by a rotary movement of one of said annuli relative to the other.

4. A tube coupling as defined in claim 3 wherein one of said annuli is bodily rotatable upon its respective conduit to effect engagement and release of said interlocking means.

5. A tube coupling means as defined in claim 4 wherein said rotatable annulus is provided with a slot and a spring catch normally blocking the entrance of said slot, and wherein the other annulus is provided with a projection engageable in said slot and normally resiliently retained therein by said spring catch.

6. A tube coupling as defined in claim 2 wherein said connecting means comprises an annular segmental spherical web portion constituting one of the clutching portions thereof and integral spring fingers projecting in a generally axial direction from said web portion and having end parts constituting the other clutching portion thereof, said end parts being adapted to spring apart to pass over the abutting conduit member engaged thereby, whereby to effect separation of the conduits, and a locking ring for encircling said end parts and preventing such spreading movement, whereby to lock them in engagement with said abutting member.

7. A tube coupling as defined in claim 2 wherein said connecting means comprises an annular segmental spherical web portion, generally conforming to the contour of said female end portion and in abutting, universally movable engagement therewith, and a plurality of integral spring fingers extending from said web portion in a generally axial direction beyond the end of said female end portion and converging inwardly to engage said bead, said spring fingers having outwardly humped end portions and inward indentations between said end portions and said inwardly converging portions, and a locking ring adapted to spring said end portions inwardly and to ride over said humps and engage in said indentations to lock said spring fingers in abutting engagement with said bead, said locking ring being removable from engagement with said spring fingers to permit the latter to spread apart and allow said bead to pass between them whereby to effect separation of said conduits.

8. A tube coupling as defined in claim 2 wherein said connecting means is in the form of a sleeve having an inwardly opening annular channel adjacent one end thereof, and having a snap ring releasably engaged in said channel, said female end portion and bead comprising abutment members one of which is releasably engaged by said snap ring, said connecting means embodying additional means in abutting engagement with the other of said abutments, for holding the parts together.

9. A tube coupling as defined in claim 2 wherein said connecting means comprises a cylindrical portion at one end and a portion converging inwardly from said cylindrical portion at the other end, said female end portion and bead constituting abutments of which said bead is engaged by said inwardly converging portion, and a snap ring cooperable with the end of said cylindrical portion of said connecting means to effect abutting engagement with said female end portion, whereby to normally prevent separation of said conduits, said snap ring being removable to allow said cylindrical portion of the connecting means to be slipped off the female end portion, whereby to effect separation of said conduits.

10. A tube coupling as defined in claim 2, wherein said coupling means comprises a sleeve including a cylindrical portion having at one end a bead defining an inwardly opening channel and having at its other end an inwardly converging portion, and wherein said female end portion and conduit bead constitute abutments, one of which is normally engaged by said inwardly converging portion, and a snap ring releasably engageable in said channel to effect abutting engagement against the other of said abutment members, said cylindrical portion of the connecting means being adapted to be slipped off the other of said abutment means when said snap ring is removed.

11. A tube coupling as defined in claim 2, wherein said coupling means comprises a sleeve including a cylindrical portion having at one end a bead defining an inwardly opening channel and having at its other end an inwardly converging portion, and wherein said female end portion and conduit bead constitute abutments, and a snap ring releasably engageable in said channel to effect abutting engagement against the other of said abutment members, said cylindrical portion of the connecting means being adapted to be slipped off the other of said abutment means when said snap ring is removed, said inwardly converging portion of the connecting means being provided with an inwardly opening annular channel and with a snap ring seating in said channel to effect abutting engagement with the conduit bead, the other snap ring engaging said female end portion, and said inwardly converging portion being adapted to freely pass over said bead when its associated snap ring is removed.

12. In a tube coupling, endwise telescoping, tubular conduit elements, resilient packing means between the overlapping portions of the elements, interlocking means on the elements respectively connected to maintain the elements in their telescoping relationship, at least one of the interlocking means being relatively rotatable upon its respective element to and from an interlocking position, to release the elements from each other; and resilient means arranged to resist rotation of said rotatable interlocking means from its locking position.

13. In a tube coupling, endwise telescoping, tubular conduit elements, at least one of the elements having a portion of a sphere in the telescoping part thereof, arranged to permit relative angular movement of the elements, there being recess means facing the space between the overlapping portions of the elements; a resilient deformable ring in the recess, the elements being dimensioned to frictionally engage opposite sides of the ring as the elements are slid telescopically together, deforming the ring during such sliding connection to place the ring under compression, interlocking means on the elements respectively connected to maintain the elements in their telescoping relationship, at least one of the interlocking means being relatively rotatable upon its respective element to and from an interlocking position, to release the elements from each other; and resilient means arranged to resist rotation of said rotatable interlocking means from its locking position.

14. In a tube coupling, endwise telescoping, tubular conduit elements, at least one of the elements having a portion of a sphere in the telescoping part thereof; a block between the overlapping portions of the elements having recesses facing the elements respectively, resilient deformable rings in the recesses, the abutting faces of the block conforming substantially with said overlapping portions of the elements, arranged to permit relative angular movement of the elements, the elements and the block being dimensioned to frictionally engage opposite sides of the rings as the elements are slid together with the block therebetween deforming the ring during such sliding connection to place the ring under compression; interlocking means on the elements respectively connected to maintain the elements in their telescoping relationship, at least one of the interlocking means being relatively rotatable upon its respective element to and from an interlocking position, to release the elements from each other; and resilient means arranged to resist rotation of said rotatable interlocking means from its locking position.

15. In connecting means, telescoping, tubular conduit elements, a resilient, deformable ring between the elements, relatively fixed and rotatable interlocking members on the elements respectively, the rotatable locking means being rotatable about the axis of its respective element, the rotary member being rotatable to and from a locking position with respect to the fixed member; resilient means arranged to yieldingly resist rotation of the rotary member from its locking position; and means to lock the resilient means in a member locking position.

CHARLES E. PATTERSON.

REFERENCES CITED

The following references are of record in the file of this patent:

UNITED STATES PATENTS

| Number | Name | Date |
| --- | --- | --- |
| 2,219,752 | Rohr | Oct. 29, 1940 |
| 2,305,296 | Lanninger | Dec. 15, 1942 |
| 2,376,995 | Fisher | May 29, 1945 |